United States Patent
Oberdorfer

(10) Patent No.: US 11,828,343 B2
(45) Date of Patent: Nov. 28, 2023

(54) TOOTH DRIVEN OVER-TORQUE PROTECTION MECHANISM FOR A SLACK ADJUSTER OR AN AIR DISC BRAKE CLUTCH

(71) Applicant: Bendix Commercial Vehicle Systems LLC, Elyria, OH (US)

(72) Inventor: Erik W. Oberdorfer, Akron, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 226 days.

(21) Appl. No.: 17/350,575

(22) Filed: Jun. 17, 2021

(65) Prior Publication Data

US 2022/0403894 A1 Dec. 22, 2022

(51) Int. Cl.
*F16D 7/02* (2006.01)
*F16D 65/52* (2006.01)

(52) U.S. Cl.
CPC ............. *F16D 7/024* (2013.01); *F16D 65/52* (2013.01)

(58) Field of Classification Search
CPC ............. F16D 2125/24; F16D 2125/28; F16D 2125/30; F16D 65/28; F16D 65/38; F16D 65/52; F16D 65/54; F16D 2125/32; F16D 2125/36; F16D 55/226; F16D 2127/10; F16D 2125/48; F16D 13/757; F16D 55/36; F16D 25/126; F16D 55/22; F16D 65/62
See application file for complete search history.

(56) References Cited

U.S. PATENT DOCUMENTS

| | | | |
|---|---|---|---|
| 8,684,146 B2 * | 4/2014 | Iraschko | F16D 65/567 188/71.9 |
| 8,783,427 B2 * | 7/2014 | Plantan | F16D 65/567 188/196 B |
| 10,221,907 B2 | 3/2019 | Sandberg | |
| 10,830,292 B2 | 11/2020 | Kuwahara | |
| 2006/0163014 A1 * | 7/2006 | Crewson | F16D 65/56 188/196 BA |

FOREIGN PATENT DOCUMENTS

| | | | |
|---|---|---|---|
| JP | H0745571 Y2 * | 10/1995 | |
| JP | 6478865 B2 * | 3/2019 | |
| WO | WO 2020231891 A1 * | 11/2020 | |

* cited by examiner

*Primary Examiner* — Robert A. Siconolfi
*Assistant Examiner* — Mahbubur Rashid
(74) *Attorney, Agent, or Firm* — Crowell & Moring LLP

(57) ABSTRACT

A tooth driven over-torque protection mechanism for use in a slack adjuster or as an air disc brake clutch, includes a shaft, toothed gear, a clutch device, a first spring, and a second spring. The toothed gear is disposed on the shaft. The toothed gear has a first pinion teeth set that extends along a first direction and a second teeth set that extends along a second direction. The clutch device that is also disposed on the shaft and includes an upper cam and a lower cam. The first spring biases the toothed gear against the clutch device. The second spring biases the clutch device against the toothed gear. The upper cam has cam teeth that cooperate with the second teeth set of the toothed gear in a torque transmitting manner, such that a torque applied in a clockwise direction to the first pinion teeth is transmitted to the upper cam through the second teeth set, but torque applied in a counterclockwise direction is opposed by the first spring.

16 Claims, 5 Drawing Sheets

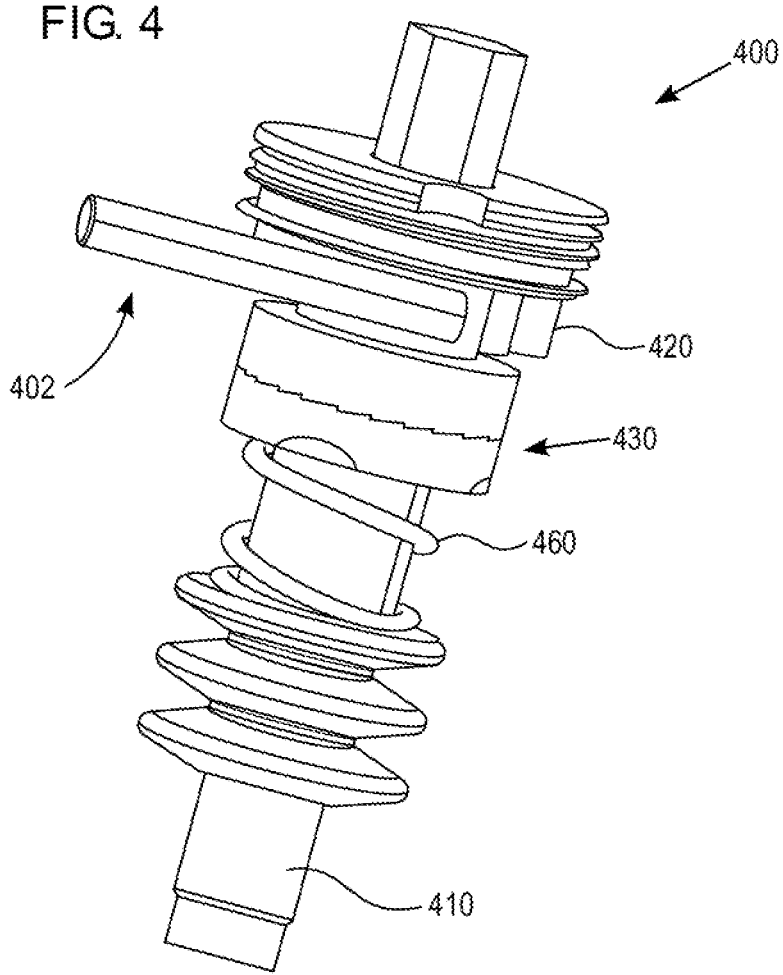

TOOTH DRIVEN OVER-TORQUE PROTECTION MECHANISM FOR A SLACK ADJUSTER OR AN AIR DISC BRAKE CLUTCH

BACKGROUND

The excessive application of torque, or over-torquing is a serious problem in any field of endeavor. Commercial brake systems are, of course, not the exception, given that over-torquing in brake systems can lead to brake failure, and all of the serious consequences associated therewith. To address this over-torquing issue, conventional brake systems are generally equipped with an over-torque protection device. Although existing over-torque protection devices are effective in preventing over-torquing, these conventional devices may rely on a wrap spring clutch design, while in some other applications a ball ramp mechanism may be implemented.

The existing wrap spring clutch design employs a wrap spring which is arranged such that it can slip to provide the over-torque protection. In the case of the ball ramp mechanism, the balls can travel up a ramp in the event of over-torquing to provide the over-torque protection. Due to limitations of these designs, these existing wrap spring clutch designs and ball ramp clutch design can over-slip, under-slip, or exhibit issues ramping the balls up and such behavior can lead to over-torquing, under-torquing or even contribute to brake failure. Further, these existing devices require tight tolerancing and, due to their complexity, they are also costly to manufacture.

SUMMARY

In light of the foregoing, it is an object of the present disclosure to provide an over-torque protection device that can address the problem of over-torquing, without exhibiting over-slipping. This and other objects are achieved by the tooth driven over-torque protection mechanism, as well as by the slack adjuster, and the air disc brake clutch disclosed herein. In particular, this and other objects are achieved by a tooth driven over-torque protection mechanism for use in a slack adjuster or as an air disc brake clutch, which includes a shaft, toothed gear, a clutch device, a first spring, and a second spring. The toothed gear is disposed on the shaft. The toothed gear has a first pinion teeth set that extends along a first direction and a second teeth set that extends along a second direction. The clutch device that is also disposed on the shaft and includes an upper cam and a lower cam. The first spring biases the toothed gear against the clutch device. The second spring biases the clutch device against the toothed gear. The upper cam has cam teeth that cooperate with the second teeth set of the toothed gear, such that a torque applied to the toothed gear is transmitted to the clutch device.

Notably, the inventive over-torque protection mechanism includes a toothed gear having two sets of teeth and an upper cam having cam teeth that cooperate with one teeth set of the toothed gear, such that a torque applied to the toothed gear is transmitted to the clutch device. As a direct result of these features, the inventive over-torque protection mechanism is able to transfer torque without over-slipping because in the inventive over-torque protection mechanism torque is transferred via a tooth-to-tooth interaction, not via a wrap spring frictional clutch mechanism nor a ball bearing slip mechanism that may be prone to over-slipping, or other operational errors. In cases of under-slipping, or excess torque generation seen in the wrap spring clutch or ball ramp clutch scenario the inventive over-torque protection mechanism protects against this via the spring-loaded cam clutch device.

The inventive over-torque protection mechanism not only solves the problem of over-slipping, which affects conventional over-torque protection mechanisms, but in addition the inventive over-torque protection mechanism exhibits a number of unexpected and substantially improved results over conventional over-torque protection mechanisms.

For example, because in the inventive over-torque protection mechanism torque is transferred via a tooth-to-tooth interaction, rather than via a slip mechanism that includes ball bearings or a wrap spring, the inventive over-torque protection mechanism does not require tight or strict tolerances. Consequently, the inventive over-torque protection mechanism is easier to manufacture and service.

The inventive over-torque protection mechanism is also less prone to failure. Since in the inventive over-torque protection mechanism torque is transferred via a tooth-to-tooth interaction, and these teeth are one-way teeth, the inventive over-torque protection mechanism operates as a one-way mechanism when needed. Because rotation is limited to a single direction, and because it lacks the ball bearings or wrap spring as in the conventional mechanism, the inventive over-torque protection mechanism is less prone to failure The inventive over-torque protection mechanism is also more accurate. This is at least because in the inventive over-torque protection mechanism torque is transferred via one-way tooth-to-tooth interaction, which allows motion in only a single direction. Since the slipping is prevented, and the amount of rotation can be controlled via the tooth-to-tooth interaction, the amount of rotation can be accurately and repeatedly set. In the inventive over-torque protection mechanism the release or torque limit can be controlled to an almost exact value due to the cam mechanism clutch device, something that is simply not possible in the conventional mechanisms.

The inventive over-torque protection mechanism also shows great versatility. That is, the inventive over-torque protection mechanism may be used in multiple applications. For instance, as will be discussed below, the inventive over-torque protection mechanism may be implemented as a slack adjuster or slack adjuster clutch. Additionally, and also as discussed below, the inventive over-torque protection mechanism may also be implemented as an air disc brake clutch.

In addition to these numerous unexpected and substantially improved results over conventional over-torque protection mechanisms, the inventive over-torque protection mechanism has a compact and simple package, is more robust, less expensive, and less complex than conventional over-torque protection mechanisms.

Other objects, advantages and novel features of the present invention will become apparent from the following detailed description of one or more preferred embodiments when considered in conjunction with the accompanying drawings, which:

BRIEF DESCRIPTION OF THE DRAWINGS

FIG. 4 is a schematic showing the interaction between the inventive tooth driven over-torque protection mechanism and a link.

DETAILED DESCRIPTION

Figure 1A:
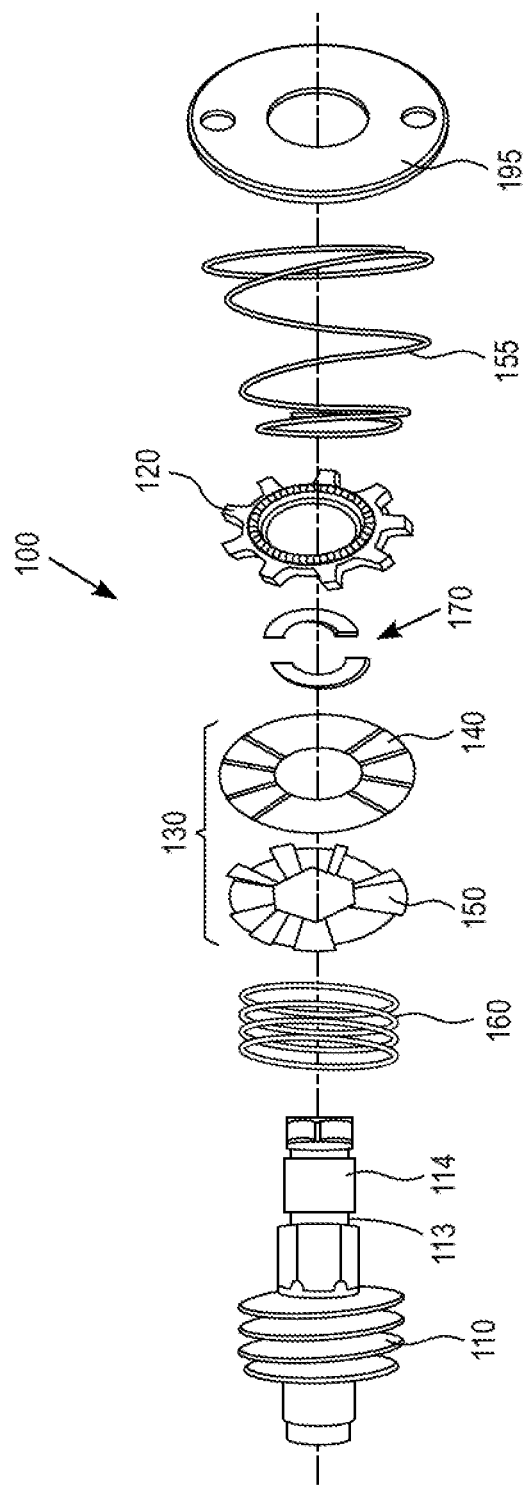
FIG. 1A is a plan view of an inventive tooth driven over-torque protection mechanism.

As shown in FIG. 1A the inventive tooth driven over-torque protection mechanism 100 includes a shaft 110 and a toothed gear 120. As is more clearly shown in FIG. 1B, the toothed gear 120 may be disposed on the shaft 110 and may also include a first pinion teeth set 180 that extends along a first direction and a second teeth set 190 that extends along a second direction. With reference to FIG. 1A, the inventive tooth driven over-torque protection mechanism 100 also includes a clutch device 130. As can be seen in FIG. 1A, this clutch device 130 is composed of two different components, which include an upper cam 140 and a lower cam 150, when the clutch device 130 is disposed on the shaft 110.

The inventive tooth driven over-torque protection mechanism 100 also includes a first spring 155 that biases the toothed gear 120 against the clutch device 130. Additionally, the inventive tooth driven over-torque protection mechanism 100 also includes a second spring 160 that biases the clutch device against the toothed gear 120.

Figure 1B:
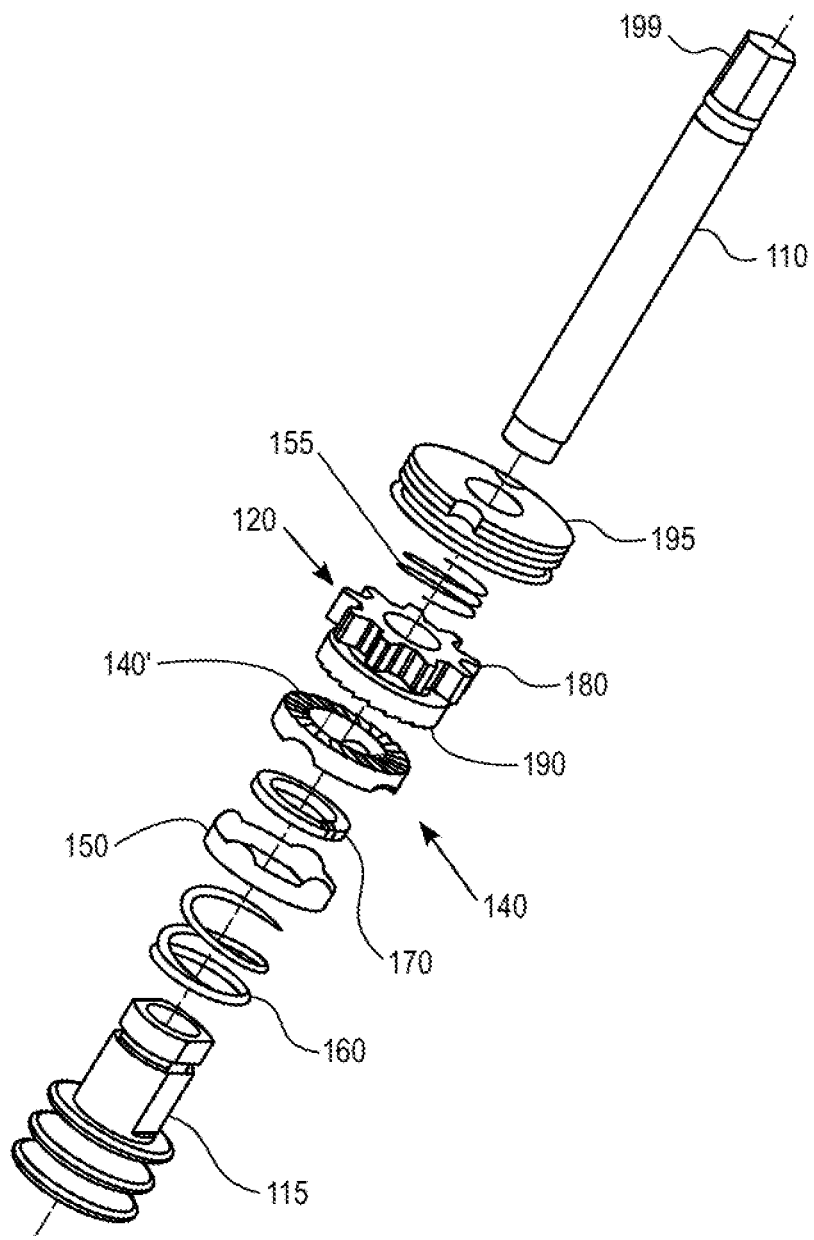
FIG. 1B is an exploded view of the inventive tooth driven over-torque protection mechanism.
Figure 2:
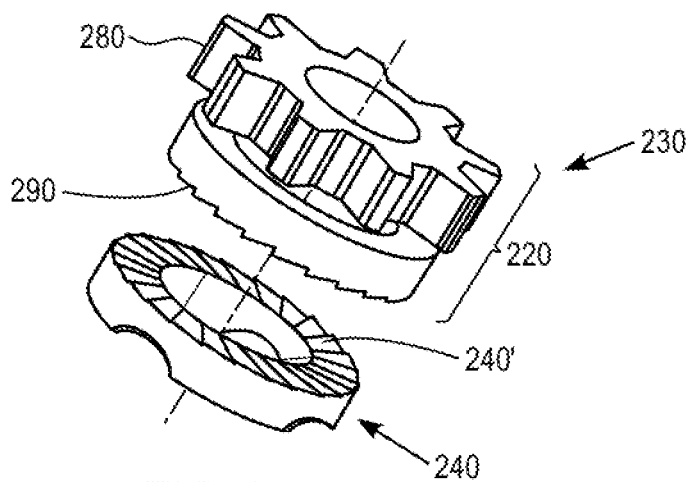
FIG. 2 is an exploded view showing the interaction between the inventive toothed gear and the inventive upper cam.

Notably, and with reference to FIG. 2, in the inventive tooth driven over-torque protection mechanism the upper cam 240 has cam teeth 240', and this upper cam teeth 240' is configured to cooperate with the second teeth set 290 of the toothed gear 220. With this configuration, and with reference to FIG. 1B, a torque that is applied to the toothed gear 120 is transmitted to the clutch device 130 (e.g., 140 and 150).

In the inventive tooth driven over-torque protection mechanism the result of an applied torque is direction dependent. For example, with reference to the FIG. 2, during operation of the inventive tooth driven over-torque protection mechanism a torque that is applied in clockwise direction to the first pinion teeth set 280 is transmitted to the upper cam 240 through an interaction between the second teeth set 290 and the cam teeth 240'. Notably, however, torque that is applied in a counterclockwise direction is opposed by the first spring 155 (in FIG. 1A). Thus, in the inventive tooth driven over-torque protection mechanism whether the torque is transmitted for continued rotation or resisted will depend on a direction of rotation at the toothed gear 220.

As shown in FIG. 2, the multiple teeth sets of tooth gear 220 point in different directions. In fact, as shown in FIG. 2, the toothed gear 220 has a first pinion teeth set 280 and a second teeth set 290. Further, the first pinion teeth set 280 extends in first direction, and the second teeth set 290 that is different than the first direction. In fact, as shown in FIG. 2, the toothed gear has teeth that extend in a first direction is radially outward from the toothed gear 220 (e.g., the first pinion teeth set 280), and that also extend along a second direction which is axially away from the toothed gear 220 (e.g., the second teeth set 290). In other words, if, for example, the first pinion teeth set 280 extend along a first direction, then the second teeth set 290 extend along a second direction that is orthogonal to the first direction. Needless to say, the same would apply if the second teeth set 290 is taken as extending in the first direction. the first direction is orthogonal to the second direction.

Notably, in the inventive tooth driven over-torque protection mechanism 100, and more particularly in the toothed gear 220 the two different sets of teeth disposed therein are configured to rotate in different directions. For instance, in the toothed gear 220 the first pinion teeth set 280 is configured to rotate in a first direction and a second direction that is opposite of the first direction. For example, in a clockwise as well as counter clockwise direction. The second teeth set 290, however, is not likewise configured. In fact, the second teeth set 290 is configured to rotate in a single direction. Thus, the second teeth set 290 may rotate only in one of a clockwise or a counter clockwise direction, but not both directions. In order to achieve this single direction of ration, the second teeth set 290 may be embodied as curved, or saw-like teeth which allow rotation in only a single direction. The inventive tooth driven over-torque protection mechanism 100, however, need not be limited to such configuration. In fact, in other embodiments the second teeth set 290 may be any kind of teeth that may occur to those having ordinary skill in the art, which allow rotation in only a single direction.

With reference to FIG. 1A, in the inventive tooth driven over-torque protection mechanism 100 the shaft 110 may have different cross-sectional shapes. For instance, at a region of the shaft 110 where the clutch device 130 is disposed the shaft 110 may have a given cross-sectional shape which differs from a cross-sectional shape at other regions of the shaft 110. That is, for example, the shaft 110 may be generally formed as a cylinder with a circular cross-sectional shape, while some regions of the shaft 110 may have different cross-sectional shapes, and these cross-sectional shapes may be hexagonal, pentagonal, quadrangular, or triangular (as some examples). The inventive tooth driven over-torque protection mechanism 100, however, need not be limited to such configuration. In fact, in the inventive tooth driven over-torque protection mechanism 100 the shaft 110 may have any cross-sectional shape as may occur to those having ordinary skill in the art, so long as some regions of the shaft 110 have different cross-sectional shape than other regions thereof.

Moreover, additional components may form fit with the shaft. For example, as shown in FIG. 1A in some embodiments the lower cam 150 may define an axial opening having a same shape as the given cross-sectional shape of the shaft 110, so that the lower cam 150 form fits the shaft 110 and is slidable thereupon. For instance, in the embodiment shown in FIG. 1A both the lower cam 150 and the shaft 110 may define complementary shape that is, in this particular example, hexagonal. The inventive tooth driven over-torque protection mechanism 100, however, need not be limited to such configuration. For instance, in other embodiments the cross-sectional shape of the lower cam 150 could be circular, pentagonal, quadrangular, or triangular, or any other shape as may occur to those having ordinary skill in the art. Needless to say, the shaft 110, at a region where the lower cam 150 is coupled thereto, would have a complementary shape thereto, as long as the lower cam 150 is able to slide up and down along the axis of the shaft 110 to compress the second spring 160, which acts as a main power spring, so that the lower cam 150 may rotate in a clockwise or counterclockwise direction along with the shaft 110, as if the lower cam 150 were locked to the shaft 110. To accomplish this any complementary shape, as may occur to those having ordinary skill in the art will be suitable, even an embodiment in which both shapes are circular, provided that a friction fit or a slot and key mechanism is employed.

It should be noted that not all components that are mounted on the shaft 110 have the same axial opening shape. For instance, in one embodiment in the inventive tooth driven over-torque protection mechanism 100 at least one of the upper cam 140 and the toothed gear 120 define an axial opening having a different shape as the shape of the axial opening of the lower cam 150. That is, as can be seen in FIG. 1A, the axial openings of both the upper cam 140 and the toothed gear 120 define a circular shape, while the axial opening of the lower cam 150 defines a hexagonal shape. It should, of course, be understood that the axial opening shapes of the upper cam 140 and toothed gear 120 need not be limited to circular. In fact, the axial opening shapes of the upper cam 140 and toothed gear 120 may also be cylindrical, pentagonal, quadrangular, or triangular, or any other shape as may occur to those having ordinary skill in the art. Further, the upper cam 140 and the toothed gear 120 need not define the same axial opening shape, since in other embodiments the axial opening shape of the upper cam 140 and the toothed gear 120 may differ.

Further, in other embodiments, at least one of the upper cam 140 and the toothed gear 120 may define an axial opening having a same shape as a shape of the axial opening of the lower cam 150. Needless to say, this same shape may be circular, pentagonal, quadrangular, or triangular, or any other shape as may occur to those having ordinary skill in the art. Thus, it should be noted that the upper cam 140, lower cam 150, and the toothed gear 120 may define an axial opening having the same shape, or all having a different shape, or any conceivable combination as may occur to those having ordinary skill in the art. Additionally, the shapes themselves may be any shape as may occur to those having ordinary skill in the art.

With reference to FIG. 1A, the inventive tooth driven over-torque protection mechanism 100, includes two springs a first spring 155 and a second spring 160. The first spring 155 biases the toothed gear 120 against the clutch device 130. The second spring 160 biases the clutch device 130 against the toothed gear 120. These two springs, however, differ not only in their location, but also in their spring characteristics. For instance, in one embodiment the second spring 160 has a higher spring constant than the first spring 155. A person having ordinary skill in the art should realize that the total yoke torque may vary. However, the total yoke torque may not, in any event, exceed 850-inch pounds for the slack adjuster implementation. As an illustrative example, in relation to slack adjuster pinion torque, this value is roughly 475 to 500 inch lbs.

As shown in FIG. 1A the inventive tooth driven over-torque protection mechanism 100, may include a locking mechanism 170. The locking mechanism 170 may be interposed between the toothed gear 120 and the upper cam 140. The locking mechanism 170 is configured to load the second spring 160. That is, upon assembly the inventive tooth driven over-torque protection mechanism 100, is preloaded in order to produce a controlled rotation response. For instance, in one embodiment, the load may correspond to a maximum allowable torque before the clutch device 130 rotates and slides along shaft 110 and compresses spring 160.

The locking mechanism 170 may vary. In fact, as can be seen in FIG. 1A, in one embodiment the locking mechanism 170 may comprise at least a pair of half-moon shaped locks. These half-moon locks are brought into engagement with cavity or trench 113, additional cavities or trenches may be provided to accommodate, for example, an O-ring which seals the bearing cover 195. The trench or cavity 113 may span around an outer diameter thereof. It should be noted, however, that it is not necessary for the cavity or trench 113 to span around entire outer diameter of the shaft 110 In fact, in some embodiments the cavity or trench 113 may run around only a portion of the outer diameter of the shaft. Upon engagement with said cavity or trench 113 the half-moon locks 170 prevent displacement along a length of the shaft 110.

The inventive tooth driven over-torque protection mechanism 100, however, need not be limited to such configuration. For instance, in other embodiments the locking mechanism 170 may be embodied as a full snap ring, or any other locking mechanism as may occur to those having ordinary skill in the art, as well as the locking mechanism 170 prevents motion along a longitudinal direction of the shaft 110.

Figure 3A:
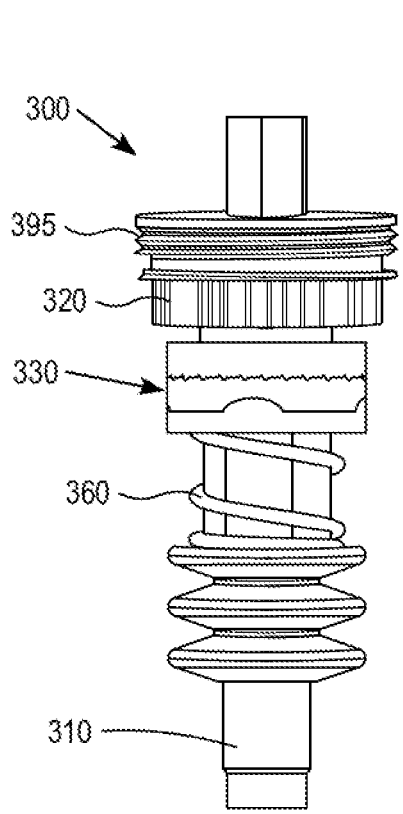
FIG. 3A is a schematic showing the inventive tooth driven over-torque protection mechanism as an inventive slack adjuster.
Figure 3B:
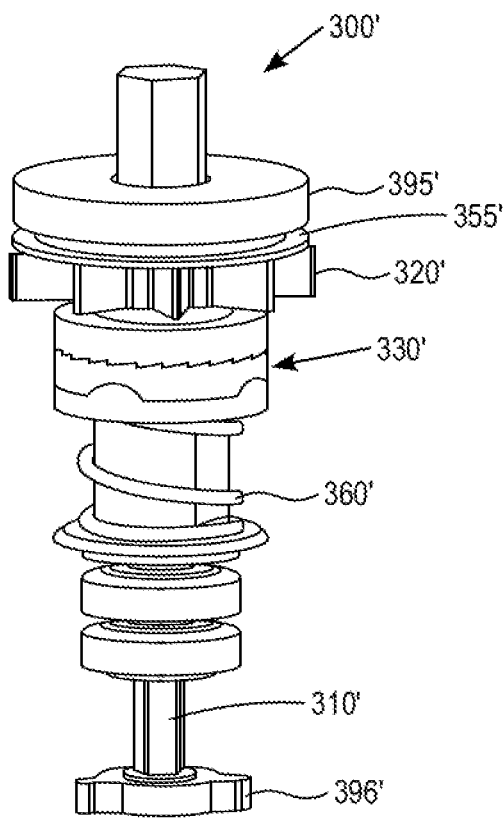
FIG. 3B is a schematic showing the inventive tooth driven over-torque protection mechanism as an air disc brake clutch.

Additionally, the inventive tooth driven over-torque protection mechanism 100 may include a cover 195. As seen in FIGS. 1A, 3A, and 3B this cover (195, 395, 395') may be disposed on an axial end of the shaft (110, 310, 310') in such a way so as to contact the first spring 155. The cover (195, 395, 395') may be removably attached to shaft (110, 310, 310'). This removable attachment may be achieved via different means. For instance, in one embodiment the cover (195, 395) may be threaded on the housing containing the device, which housing may have a corresponding threaded opening so that the cover (195, 395) is thereby threaded thereinto.

As shown in FIG. 1B the distal end 199 of the shaft 110 near the cover 195 may have a different shape than the rest of the shaft 110. For instance, in the embodiment shown in FIG. 1B, the distal end 199 defines a hexagonal shape, which facilitates the application of a torque thereto with a work tool (not shown). The inventive tooth driven over-torque protection mechanism 100, however, need not be limited to such configuration, and in other embodiments the distal end 199 may have any shape as may occur to those of ordinary skill in the art.

With the above-configuration, the inventive tooth driven over-torque protection mechanism 100 solves the problem of over-torquing, without exhibiting over-slipping because in the inventive tooth driven over-torque protection mechanism torque is transmitted via tooth-to-tooth interaction, which can rotate, thereby transferring high torque, in only a single direction. Moreover, inventive tooth driven over-torque protection mechanism is easier to manufacture and service, is less prone to failure, is more accurate, shows great versatility, has a compact and simple package, is more robust, less expensive, and less complex than conventional over-torque protection mechanisms.

In a further development, with reference to FIGS. 3A and FIG. 4, this disclosure is also directed to a slack adjuster (300 400) for a vehicle brake. The inventive slack adjuster (300 400) includes a housing (not shown), a link 402, a shaft (310 410), and tooth driven means (320 420). The housing is configured to be operatively coupled to a brake actuator. The link 402 is disposed in the housing. The shaft (310 410) is operatively coupled to the link. The tooth driven means (320 420) is configured to prevent over-torque of the slack adjuster (300 400), and is disposed on the shaft (310 410).

Figure 3C:
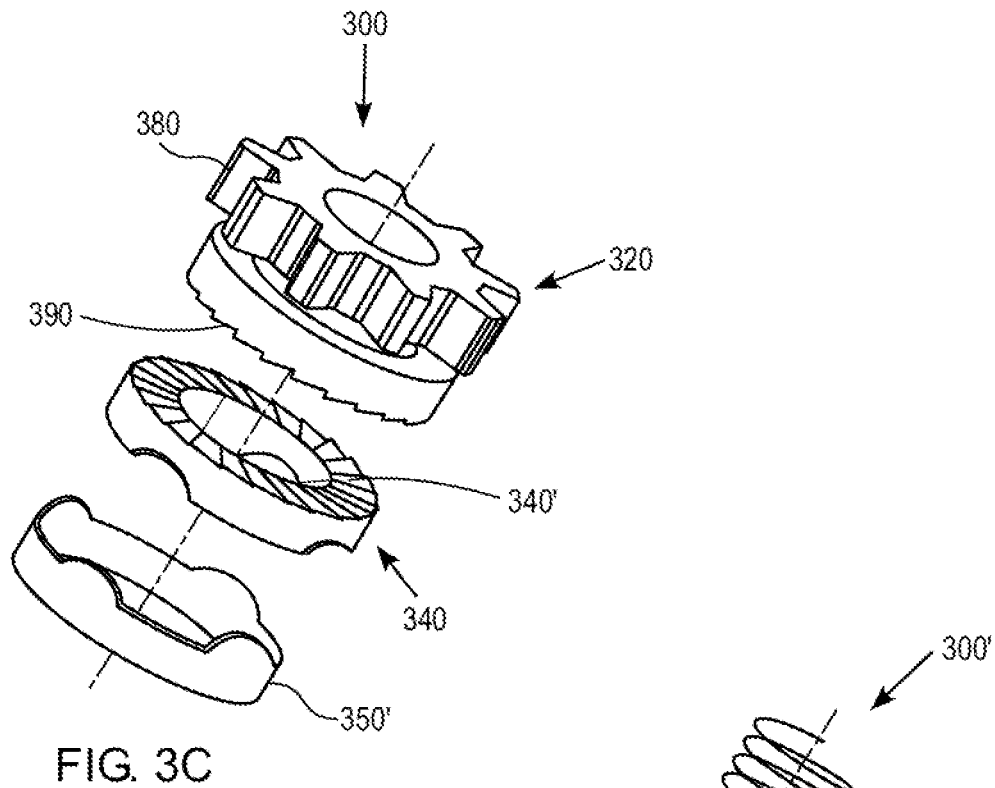
FIG. 3C is an exploded view showing the interaction between the inventive toothed gear and the inventive upper cam.

With reference to FIG. 3C, in the inventive slack adjuster 300 the tooth driven means 320 includes two teeth sets, a first pinion teeth set 380 and a second teeth set 390. The second teeth set 390 is configured to engage with cam teeth 340' which are disposed on a first end of a clutch cam 340. With this configuration, torque that is applied at the first pinion teeth set 380 can be transmitted to the cam teeth 340' via an interaction between the cam teeth 340' with the second teeth set 390 of the tooth driven means 320.

Further, the configuration of the different teeth set in the tooth driven means 320 may differ. For instance, in one embodiment the first pinion teeth set 380 may be a two-way teeth set, which can rotate in both a clockwise and in a counterclockwise direction. On the other hand, the second teeth set 390 may be a one-way teeth set which can rotate (in both directions) but only transmit its force of rotation (torque) only along a single direction (e.g., clockwise or counter clockwise direction, but not both).

Moreover, the different teeth sets on the tooth driven means 320 may extend along different directions. For example, as shown in the embodiment of FIG. 3C, the first pinion teeth set 380 may extend radially outward from the tooth driven means 320, while the second teeth set 390 may extend along a second direction that is orthogonal to the radially outward direction.

With the above configuration, the inventive slack adjuster solves the problem of over-torquing, without exhibiting over-slipping because in the inventive tooth driven over-torque protection mechanism torque is transmitted via tooth-to-tooth interaction, which can rotate in only a single direction. This, coupled with the cam mechanism which limits torque, offers over-torque protection to the system. Moreover, inventive tooth driven over-torque protection mechanism is easier to manufacture and service, is less prone to failure, is more accurate, shows great versatility, has a compact and simple package, is more robust, less expensive, and less complex than conventional over-torque protection mechanisms.

In a further development, this disclosure is directed to a tooth driven over-torque protected air disc brake clutch 300'. With reference to FIG. 3B, the inventive a tooth driven over-torque protected air disc brake clutch 300' includes a shaft 310', a toothed gear 320', a clutch device 330', a threaded tube adapter 396', a first spring 360', and a second spring 355' The toothed gear 320' is disposed on the shaft 310'.

Figure 3D:
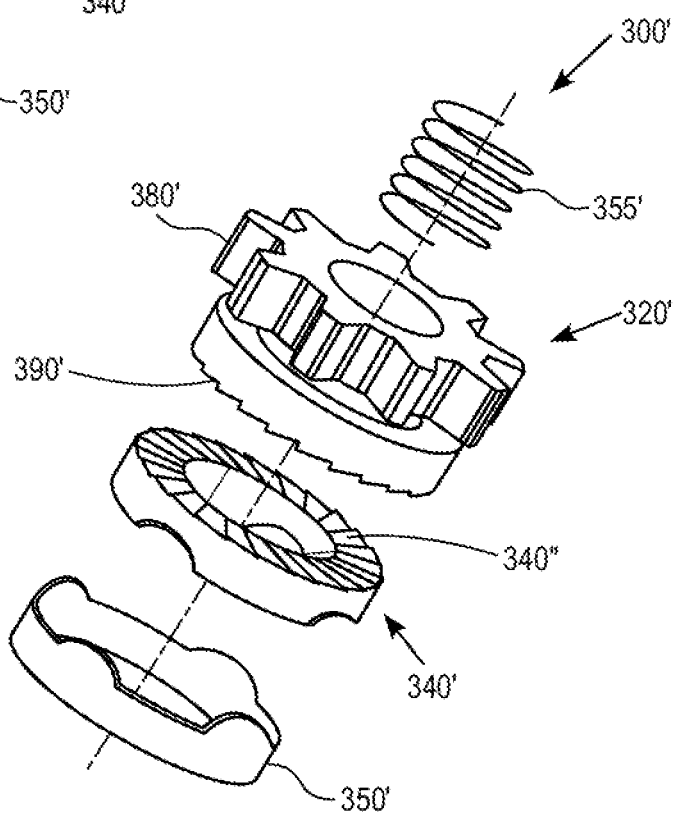
FIG. 3D is another exploded view showing the interaction between the inventive toothed gear and the inventive upper cam.

With reference to FIG. 3D, the toothed gear 320' includes multiple teeth sets. In fact, as can be seen in FIG. 3D, the toothed gear 320' has a first teeth set 380' that extends along a first direction and a second teeth set 390' that extends along a second direction. With reference to FIG. 3B, the inventive tooth driven over-torque protected air disc brake clutch 300' also includes a clutch device 330' that is disposed on the shaft 310'. This clutch device 330' is a multi-piece cam device, which in the embodiment shown in FIG. 3D includes an upper cam 340' and a lower cam 350'. The tooth driven over-torque protected air disc brake clutch 300' also includes a threaded tube adapter 396' that is disposed on a distal end of the shaft 310'. Moreover, the inventive tooth driven over-torque protected air disc brake clutch 300' includes multiple springs. In fact, the inventive tooth driven over-torque protected air disc brake clutch 300' includes a first spring 355'. As shown in FIG. 3B, the first spring 360' biases the toothed gear 320' against the clutch device (340' 350'). The first spring 355' biases the clutch device (340' 350') against the toothed gear 320'. Further, the upper cam 340' has cam teeth 340" that cooperate with the second teeth set 390' of the toothed gear 320', such that a torque applied to the toothed gear 320' is transmitted to the clutch device (340' 350'). The cam teeth 340" and the second teeth set 390' of the toothed gear 320' are one-way teeth.

With the above configuration, inventive tooth driven over-torque protected air disc brake clutch solves the problem of over-torquing, without exhibiting over-slipping because in the inventive tooth driven over-torque protection mechanism torque is transmitted via tooth-to-tooth interaction, which can rotate and transmit torque in only a single direction. This, coupled with the cam mechanism which limits torque offers over-torque protection to the system. Moreover, inventive tooth driven over-torque protected air disc brake clutch is easier to manufacture and service, is less prone to failure, is more accurate, shows great versatility, has a compact and simple package, is more robust, less expensive, and less complex than conventional over-torque protection mechanisms.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A tooth driven over-torque protection mechanism for use in a slack adjuster or as an air disc brake clutch, comprising:
   a shaft;
   a toothed gear that is disposed on the shaft, the toothed gear having a first pinion teeth set that extends along a first direction and a second teeth set that extends along a second direction;
   a clutch device that is also disposed on the shaft, the clutch device having an upper cam and a lower cam;
   a first spring that biases the toothed gear against the clutch device;
   a second spring that biases the clutch device against the toothed gear, wherein
     the upper cam has cam teeth that cooperate with the second teeth set of the toothed gear in a torque transmitting manner, such that a torque applied in clockwise direction to the first pinion teeth is transmitted to the upper cam through the second teeth set, but torque applied in a counterclockwise direction is opposed by the first spring,
     at a region of the shaft where the clutch device is disposed the shaft has a given cross-sectional shape which differs from a cross-sectional shape at other regions of the shaft, and
     the lower cam defines an axial opening having a same shape as the given cross-sectional shape of the shaft, so that the lower cam form fits the shaft and is slidable thereupon.

2. The tooth driven over-torque protection mechanism according to claim 1, wherein the first direction is radially outward from the toothed gear and the second direction is axially away from the toothed gear.

3. The tooth driven over-torque protection mechanism according to claim 1, wherein the first direction is orthogonal to the second direction.

4. The tooth driven over-torque protection mechanism according to claim 1, wherein the first teeth set is configured to rotate in a first direction and a second direction that is opposite of the first direction, and the second teeth set is configured to rotate in a single direction.

5. The tooth driven over-torque protection mechanism according to claim 1, wherein the given cross-sectional shape is one of hexagonal, pentagonal, quadrangular, or triangular.

6. The tooth driven over-torque protection mechanism according to claim 1, wherein at least one of the upper cam and the toothed gear define an axial opening having a different shape as the shape of the axial opening of the lower cam.

7. The tooth driven over-torque protection mechanism according to claim 1, wherein at least one of the upper cam and the toothed gear define an axial opening having a same shape as a shape of the axial opening of the lower cam.

8. The tooth driven over-torque protection mechanism according to claim 1, wherein the second spring has a higher spring constant than the first spring.

9. The tooth driven over-torque protection mechanism according to claim 1, wherein the first pinion teeth are a two-way teeth set that extends radially outward from the shaft and the second teeth set are a one way teeth set that extends orthogonal to the first pinion teeth set.

10. A tooth driven over-torque protection mechanism for use in a slack adjuster or as an air disc brake clutch, comprising:
a shaft;
a toothed gear that is disposed on the shaft, the toothed gear having a first pinion teeth set that extends along a first direction and a second teeth set that extends along a second direction;
a clutch device that is also disposed on the shaft, the clutch device having an upper cam and a lower cam;
a first spring that biases the toothed gear against the clutch device;
a second spring that biases the clutch device against the toothed gear, wherein the upper cam has cam teeth that cooperate with the second teeth set of the toothed gear in a torque transmitting manner, such that a torque applied in clockwise direction to the first pinion teeth is transmitted to the upper cam through the second teeth set, but torque applied in a counterclockwise direction is opposed by the first spring; and
a locking mechanism interposed between the toothed gear and the upper cam, the locking mechanism being configured to load the second spring, which load corresponds to maximum allowable torque before the clutch device rotates.

11. The tooth driven over-torque protection mechanism according to claim 10, wherein the locking mechanism comprises at least one of a pair of half-moon shaped locks.

12. The tooth driven over-torque protection mechanism according to claim 11, wherein the shaft defines a trench that runs around an outer diameter thereof, the trench being configured to receive the pair of half-moon locks or a snap ring.

13. The tooth driven over-torque protection mechanism according to claim 12, further comprising: a cover that is disposed on the shaft so as to contact the first spring.

14. The tooth driven over-torque protection mechanism according to claim 13, wherein the cover is removable from the shaft.

15. A slack adjuster for a vehicle brake, comprising:
a housing being configured to be operatively coupled to a brake actuator;
a link disposed in the housing;
a shaft operatively coupled to the link;
a clutch device disposed on the shaft, the clutch device having an upper cam and a lower cam;
at least one spring disposed on the shaft;
tooth driven means for preventing over torque of the slack adjuster, the tooth driven means being disposed on the shaft, wherein
the tooth driven means includes first pinion teeth and a second teeth set, and torque applied in clockwise direction to the first pinion teeth is transmitted to clutch device via the second teeth set, but torque applied in a counterclockwise direction is opposed by the at least one spring; and
a locking mechanism interposed between the toothed driven means and the upper cam, the locking mechanism being configured to load a second spring, which load corresponds to maximum allowable torque before the clutch device rotates.

16. A tooth driven over-torque protected air disc brake clutch, comprising:
a shaft;
a toothed gear that is disposed on the shaft, the toothed gear having a first teeth set that extends along a first direction and a second teeth set that extends along a second direction;
a clutch device that is also disposed on the shaft, the clutch device having an upper cam and a lower cam;
a threaded tube adapter that is disposed on a distal end of the shaft;
a first spring that biases the toothed gear against the clutch device;
a second spring that biases the clutch device against the toothed gear, wherein
the upper cam has cam teeth that cooperate with the second teeth set of the toothed gear, such that a torque applied to the toothed gear is transmitted to the clutch device, and
the cam teeth and the second teeth set of the toothed gear are one-way teeth; and
a locking mechanism interposed between the toothed gear and the upper cam, the locking mechanism being configured to load the second spring, which load corresponds to maximum allowable torque before the clutch device rotates.

* * * * *